3,007,671
REPLACEMENT VALVE ASSEMBLY
Joseph E. Bartlett, Olathe, Kans.
Filed Jan. 23, 1959, Ser. No. 788,590
1 Claim. (Cl. 251—88)

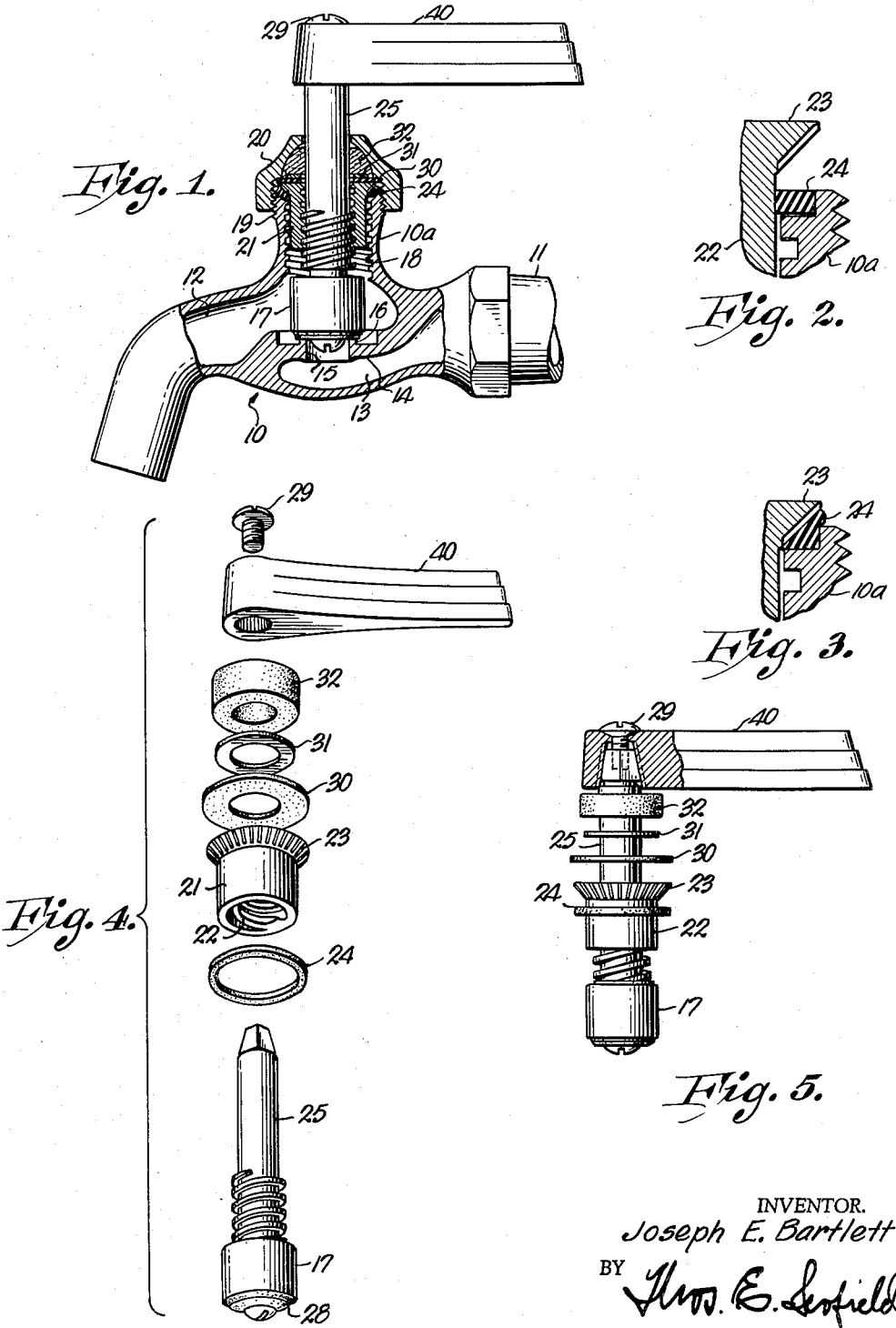

This invention relates to a replacement valve assembly for employment in conventional faucet structures and refers more particularly to an improved replacement assembly which has features of construction which render it more universally applicable to faucets of various manufacturers than has been possible in the past while improving also the operational capabilities and positive liquid controlling aspects thereof.

This application is a continuation-in-part of my co-pending application Serial 514,979, filed June 13, 1955, now abandoned.

It has long been recognized as desirable to provide a means for replacing the operative parts of a conventional spigot or faucet without requiring removal of the faucet body (or cock) from the pipe which it serves. To this end there have been devised in the past various valve replacement assemblies which can be substituted for the original when the threaded stem or some part of the valve member itself of the original valve becomes worn or broken. While some of these arrangements have proved relatively serviceable there still remains several problems in obtaining optimum results. My present invention has for its principal object the elimination of these problems.

One of the main problems which has previously confronted workers in this art has been the difficulty in assuring proper alignment of the replacement assembly in the faucet body without requiring auxiliary cutting or filing away of the metal on the faucet body. In many cases, inexact dimensioning of the faucet body prevents correct alignment. While in some instances the removal of metal by filing or other treatment can result in a makeshift fitting, nevertheless there are many other cases where this cannot be done, with the result that leakage is encountered. It is a feature of my invention that through the use of a special construction for the assembly I have been able to provide sufficient flexibility in mounting of the stem, without in any way affecting the watertight seal at the stem, to permit it to be self-aligning so that the stem will inherently adapt itself to that alignment which produces complete and effective sealing of the valve member in the valve seat.

It is a further feature of my invention that the self-aligning properties of the valve assembly described above are obtained while still assuring of a fixed and unchanging closed position for the handle. The permanent indexing of the handle is achieved without requiring the valve member itself (that is the part which comes into sealing engagement with the seat at the closed or shutoff position of the handle) to assume any of the resistance to rotation of the handle. By the provision of an arrangement achieving the aforementioned results the effective life of the valve member is materially increased, since the valve member itself is at no time subjected to wear by sliding contact with the seat. A specific and important object of the invention in connection with the positive indexing feature noted above is to achieve this indexing without requiring any cutting or other treatment of the faucet body itself, thus obviating the need for special tools and making the replacement assembly easily installed by unskilled persons.

Still another feature of the invention is the ready adaptability of a replacement assembly of one size to faucets which vary from one another within given limits in respect to diameter of the stem opening and depth of the faucet body. In other words, it is possible to utilize my replacement valve assembly in faucet bodies of different manufacturers, which is an important achievement since it eliminates the need for custom designed assemblies for each manufacturer's product.

Another feature of the invention resides in the provision of a specially formed outside end on the valve stem which renders it readily connectable with handles made by the various manufacturers of the faucets, thus eliminating any need for purchase of new handles when replacement takes place.

Other and further objects of the invention together with the features of novelty appurtenant thereto will appear in the course of the following description.

In the accompanying drawings, in which like reference numerals indicate like parts in the various views, and which are to be read in conjunction with the instant specification;

FIG. 1 is a fragmentary side elevation, partly in section, of a replacement valve assembly embodying the invention and incorporated within a typical faucet or spigot;

FIG. 2 is an enlarged fragmentary sectional view showing the relationship of the frusto-conical sleeve flange, the locking and sealing ring, and valve receiving extension on the faucet prior to completion of the installation;

FIG. 3 is an enlarged fragmentary sectional view similar to FIG. 2 showing the relationship of the above-identified components when installation has been completed;

FIG. 4 is a perspective view of the replacement valve assembly along with certain packing and the handle, the elements being in exploded relation; and FIG. 5 is a side elevation showing the elements of FIG. 4 in assembled relationship but not in place in the spigot.

Referring now to the drawings and initially to FIG. 1, a typical spigot or faucet is indicated at reference numeral 10. As is known the faucet is connected through a suitable coupling with a water pipe or conduit 11 leading to a source of water. The faucet body contains a pair of passageways 12 and 13 which are separated by a partition 14, which in this case has a horizontal portion apertured to provide a communicating passageway 15. The upper end of passageway 15 is surrounded by an upstanding valve seat 16. Flow through the communicating passageway 15 is controlled by the valve member 17, more of which will be said later.

It will be observed that aligned with the valved passageway 15 on the upper side of the faucet body is a cylindrical extension 10a open at its upper end. This extension is internally threaded as at 18 and near its upper end is provided with external threads 19 which provide a connection for a cap nut 20. As will be understood by those versed in this art, in the original faucet structure as it is sent out from the manufacturer a valve stem extends through the extension, the stem having external threads which mate with the internal threads 18 of the extension and serve to move the stem upwardly and downwardly with respect to the valve body as the stem is rotated. Such a stem ordinarily carries some sort of valving member at its lower end which is raised and lowered with respect to the valve seat to control the flow of water through passageway 15. The original stem, however, is not shown in the drawings.

The present invention contemplates that whenever the original stem becomes faulty in its operation it will be removed from the faucet by unscrewing the cap nut followed by withdrawal of the stem. In this condition the faucet is ready for reception of the replacement assembly of the present invention, which will now be described.

One of the principal elements of the replacement assembly is a sleeve-like member 21 of somewhat smaller diameter than the faucet extension 10a and adapted to be inserted therein. As will be observed the sleeve member is internally threaded as at 22. At its upper end it is provided with an external circumferential flange 23 which has one face of frusto-conical configuration, the apex of the cone being directed toward the inside of the valve body. This flange is given a diameter such that it will extend beyond and overlie the upper end of the faucet extension 10a. Preferably the angle of the frusto-conical section is at 45° with the axis of the sleeve in order to achieve the optimum area for the frusto-conical face of the flange while still preserving a substantial force component in a direction axially of the sleeve when the flange is forced downwardly against the extension, as will later be described. The face is provided with axially directed striations forming sharply ridged grooves.

Immediately below the flange 23 there is located a sealing and locking ring 24 having a generally rectangular cross section. The ring 24 is composed of material which is softer than the metal of which the sleeve is formed as well as that of which the faucet is formed. The ring must, however, have a relatively high coefficient of friction with respect to the metallic surfaces. Moreover, it should have a good degree of resilience whereby to maintain it under internal stress when it is deformed from its normal configuration. I have found that a material admirably meeting all of the physical requirements of the ring is fabric reinforced neoprene. The dimensions (as to cross section) of the locking and sealing ring must be such as to prevent metal to metal contact between the conical face of the flange and the upper end of the faucet extension 10a when installation is completed, as illustrated in FIG. 3.

The valve stem of the replacement assembly is indicated at 25 and comprises a cylindrical shaft having external threads 26 which mate with the internal threads of the sleeve. There is connected with the stem at its lower end a freely rotatable valve member 17 having a resilient washer 28 secured to its end face, the washer being of a size to register with the seating lip 16 of the faucet. While I have not shown the details of the connection of the valve member with the stem, it is imperative that the connection be substantially friction free. A ball bearing connection is especially advisable and this may be accomplished in accordance with the teachings of U.S. Letters Patent 2,490,043 issued to Robert S. Funk December 6, 1949.

The upper end of the stem 25 is provided with a pyramidal portion 25a, the lateral faces of which are equal isosceles trapezoids. By adopting the pyramidal form the upper end of the stem is readily connectable with a handle 40 having either a square recess or broached recess, the two types most generally employed in handles in use today, and a firm, nonrotatable connection is established. The pyramidal form accommodates various sizes of sockets or recesses, as will be apparent. The top of the stem is tapped to receive assembly machine screw 29 which serves the purpose of securing the handle firmly to the stem.

Immediately above the sleeve 21 are, in the order named, a friction gasket 30 which may be formed of any suitable material having a high coefficient of friction with respect to the metal of which the sleeve is composed (for example fiber), a thin adjustment shim or spacer 31, preferably formed of brass and of which there may be a number, as hereinafter pointed out, and a packing ring 32 for reception within the cap nut 20 for the purpose of assuring watertight fit around the stem. The packing ring 32 is preferably formed of a fiber reinforced rubber like composition, and is square-cut so that when the cap nut is tightened down it will be deformed to thus closely approach the surface of the stem. The frictional drag of the compressed packing 32 on the stem prevents accidental unseating of the valve by water pressure, and likewise maintains the handle in any position to which it may be set during use.

In describing the manner of assembly of the replacement equipment with the faucet body and the advantages deriving from the invention it will be assumed that the original valve structure has been removed and that the cap nut is disconnected from the body, leaving the upper end of the extension 10a open. The sleeve 21 with the stem 25 threaded therein is then inserted into the extension so that the valve member 17 approaches the valve seat 16. Of course the locking and sealing ring 24 has been placed in position on the sleeve immediately adjacent the conical face 19. The sleeve is moved into the extension until the locking ring has been brought into engagement with the end of the faucet extension 10a. It is important to note that there is not a tight fit between the cylindrical surface of the sleeve and the interior of the faucet extension; as a matter of fact it is desirable that the sleeve be so dimensioned as to be spaced slightly away from the innermost surfaces of the extension so as to permit slight play of the sleeve in the extension. Friction gasket 30 is then dropped into place on the top of the sleeve, and, if needed, spacer shims 31 are added enough of these being added so as to insure of adequate compression of the duck packing 32 when the cap nut is finally secured. It will be observed that when the cap nut is installed and tightened down upon the external threads 19 of the faucet extension, the friction gasket 30 is engaged between the end of the sleeve and the internal annular shoulder 20a of the cap nut.

As the cap nut is tightened down the roughened, striated conical face of the flange 23 is pressed tighter and tighter against the locking and sealing ring, with the result that, as shown in FIG. 3, the ridges of the face imbed themselves into the ring. The ring is also subjected to plastic deformation, material being forced upwardly and outwardly to substantially cover the frusto-conical face and thus insure of a large area of contact between the flange and ring. At the same time the lower surface of the ring is pressed tightly into engagement with the adjacent surface of the faucet extension. It is important to observe that at the fully tightened condition there still is no metal to metal contact between the sleeve and faucet extension. In other words the sleeve is fully supported upon the relatively resilient locking and sealing ring.

To complete the installation the handle 40 is fitted to the upper end of the stem and the machine screw 29 is utilized to connect the two, as earlier described. It will be apparent that now the valve is ready for operation.

The resilient mounting of the sleeve has a quite important consequence in connection with operation of the valve. As will be evident, unless the sleeve 21 is perfectly aligned axially with the communicating passageway in the valve body it will be difficult to achieve uniform seating of the valve member 17 upon the valve seat 16. This would be true, of course, if the sleeve were rigidly supported and incapable of any movement. However, the flexible and resilient support for the sleeve means that if there is any discrepancy in alignment of the sleeve with the flow passageway 15, nevertheless as the stem moves downwardly and presses the valve member 17 more firmly against the seat the axis of the sleeve can shift to bring about the necessary alignment.

When the valve is fully seated it will be obvious that further rotation of stem 25 cannot occur unless the sleeve 21 turns with it. This, however, is quite undesirable as it would result in creep of the handle successively in the direction of closing. By providing the striations in the conical face of flange 23, and by utilizing a highly frictional material for the ring the sleeve is effectively locked against such creep.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claim.

Since many possible embodiments may be made of the invention without departing from the scope thereof, it is to be understood that all matter herein set forth or shown in the accompanying drawing is to be interpreted as illustrative and not in a limiting sense.

Having thus described my invention, I claim:

The combination of a valve of the type which includes a valve body provided with an externally threaded circular opening, said opening having an innermost edge, a cap nut threadedly connected with and surrounding and covering said opening, and a valve seat within the body and aligned with said opening, a replacement valve assembly comprising an internally threaded sleeve of smaller diameter than said opening for loose insertion in said opening, said sleeve including a circumferential external flange formed to extend beyond and overlie said edge of said opening, that face of the flange closest to said edge being frusto-conical with the apex of the cone toward the inside of the body and said face provided with a striated surface, a locking and sealing ring composed of a resilient material softer than the material of said flange and said valve body but having a high coefficient of friction relative thereto surrounding said sleeve immediately adjacent said one face of said flange and of greater diameter than the innermost edge of said opening whereby to be sandwiched between said one face and said innermost edge upon insertion of the sleeve in the body, thrust means between the top of said sleeve and said cap nut for engagement by the nut to cause the striated face of the flange to bite into and deform said locking ring and compress said ring tightly against the innermost edge of said opening, a valve stem extending axially through said sleeve and terminating at one end within said valve body, said stem including threads engaging with and cooperating with the internal threads of the sleeve to cause the stem to shift toward and away from said valve seat upon rotation of the stem in opposed directions, a valve member rotatably connected with said one end of the stem and adapt to engage with and bear against said seat upon movement of the stem toward the seat, the connection between the valve member and stem being substantially frictionless whereby to cause substantially all resistance to rotation of the sleeve following seating of the valve member to be transmitted to and resisted by the locking and sealing ring.

References Cited in the file of this patent

UNITED STATES PATENTS

| | | |
|---|---|---|
| 218,936 | Cooper | Aug. 26, 1879 |
| 222,870 | Cooper | Dec. 23, 1879 |
| 728,699 | Gallagher | May 19, 1903 |
| 2,451,928 | Doerr | Oct. 19, 1948 |
| 2,629,580 | Schultis | Feb. 24, 1953 |